(12) United States Patent
Dautenhahn

(10) Patent No.: US 12,496,647 B1
(45) Date of Patent: Dec. 16, 2025

(54) OPTIMIZATION OF NITROGEN DIFFUSERS FOR DROSS REDUCTION IN A WAVESOLDER MACHINE

(71) Applicant: Illinois Tool Works Inc., Glenview, IL (US)

(72) Inventor: Jonathan M. Dautenhahn, Lake Ozark, MO (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/965,116

(22) Filed: Dec. 2, 2024

(51) Int. Cl.
*B23K 1/00* (2006.01)
*B23K 1/08* (2006.01)
*B23K 3/00* (2006.01)

(52) U.S. Cl.
CPC .................................. *B23K 1/085* (2013.01)

(58) Field of Classification Search
CPC ..... B23K 3/0653; B23K 1/085; B23K 1/0016
See application file for complete search history.

(56) References Cited

U.S. PATENT DOCUMENTS

| | | | | |
|---|---|---|---|---|
| 4,610,391 A * | 9/1986 | Nowotarski | ......... | B23K 3/0653 228/180.1 |
| 5,044,542 A * | 9/1991 | Deambrosio | .......... | B23K 1/008 118/421 |
| 5,048,746 A * | 9/1991 | Elliott | .................... | B23K 1/008 228/180.1 |
| 5,121,874 A * | 6/1992 | Deambrosio | .......... | B23K 1/008 228/232 |
| 5,203,489 A * | 4/1993 | Gileta | .................. | B23K 3/0653 228/180.1 |
| 5,240,169 A * | 8/1993 | Gileta | .................... | B23K 1/085 228/180.1 |
| 5,292,055 A | 3/1994 | Gileta | | |
| 5,397,049 A | 3/1995 | Gileta et al. | | |
| 5,411,200 A | 5/1995 | Connors et al. | | |
| 5,419,482 A * | 5/1995 | Hendrikx | ............. | B23K 3/0653 118/410 |
| 5,509,598 A * | 4/1996 | Nayar | .................. | B23K 3/0653 228/180.1 |
| 5,568,894 A * | 10/1996 | Gileta | .................... | B23K 1/203 228/223 |
| 6,478,215 B2 * | 11/2002 | Zen | ...................... | B23K 3/0653 228/180.1 |
| 8,220,699 B2 * | 7/2012 | Dong | .................. | B23K 3/0653 228/42 |

(Continued)

*Primary Examiner* — Erin B Saad
(74) *Attorney, Agent, or Firm* — Lando & Anastasi, LLP

(57) ABSTRACT

A wave soldering machine performs a wave soldering operation on an electronic substrate. The wave soldering machine includes a wave soldering station having a solder pot having a reservoir of solder material, a flow duct positioned in the reservoir of the solder pot, and a wave soldering nozzle assembly coupled to the flow duct. The nozzle assembly is configured to generate a solder wave. The wave soldering machine further includes a conveyor configured to deliver an electronic substrate to the wave soldering station, at least one first gas diffuser configured to supply gas to pass over the solder wave on each side of the solder wave and to provide a gas blanket over the solder wave, and at least one second gas diffuser configured to supply gas below the solder wave on each side of the solder wave and to provide a gas blanket under the solder wave.

17 Claims, 9 Drawing Sheets

(56) References Cited

U.S. PATENT DOCUMENTS

| | | | | |
|---|---|---|---|---|
| 8,579,182 B2* | 11/2013 | Dong | .................... | B23K 3/0653 228/218 |
| 2001/0020637 A1* | 9/2001 | Zen | ........................ | B23K 1/085 228/42 |
| 2008/0067219 A1* | 3/2008 | Barengo | .............. | B23K 3/0653 228/37 |
| 2008/0277457 A1* | 11/2008 | Mastele | ................. | B23K 1/085 228/37 |
| 2008/0302861 A1* | 12/2008 | Szymanowski | ...... | B23K 3/0653 228/37 |
| 2014/0027495 A1* | 1/2014 | Arslanian | ................ | B23K 3/08 228/37 |
| 2015/0209885 A1* | 7/2015 | Zhang | .................... | B23K 1/085 228/37 |
| 2019/0381590 A1* | 12/2019 | Dautenhahn | ........... | B23K 1/085 |

* cited by examiner

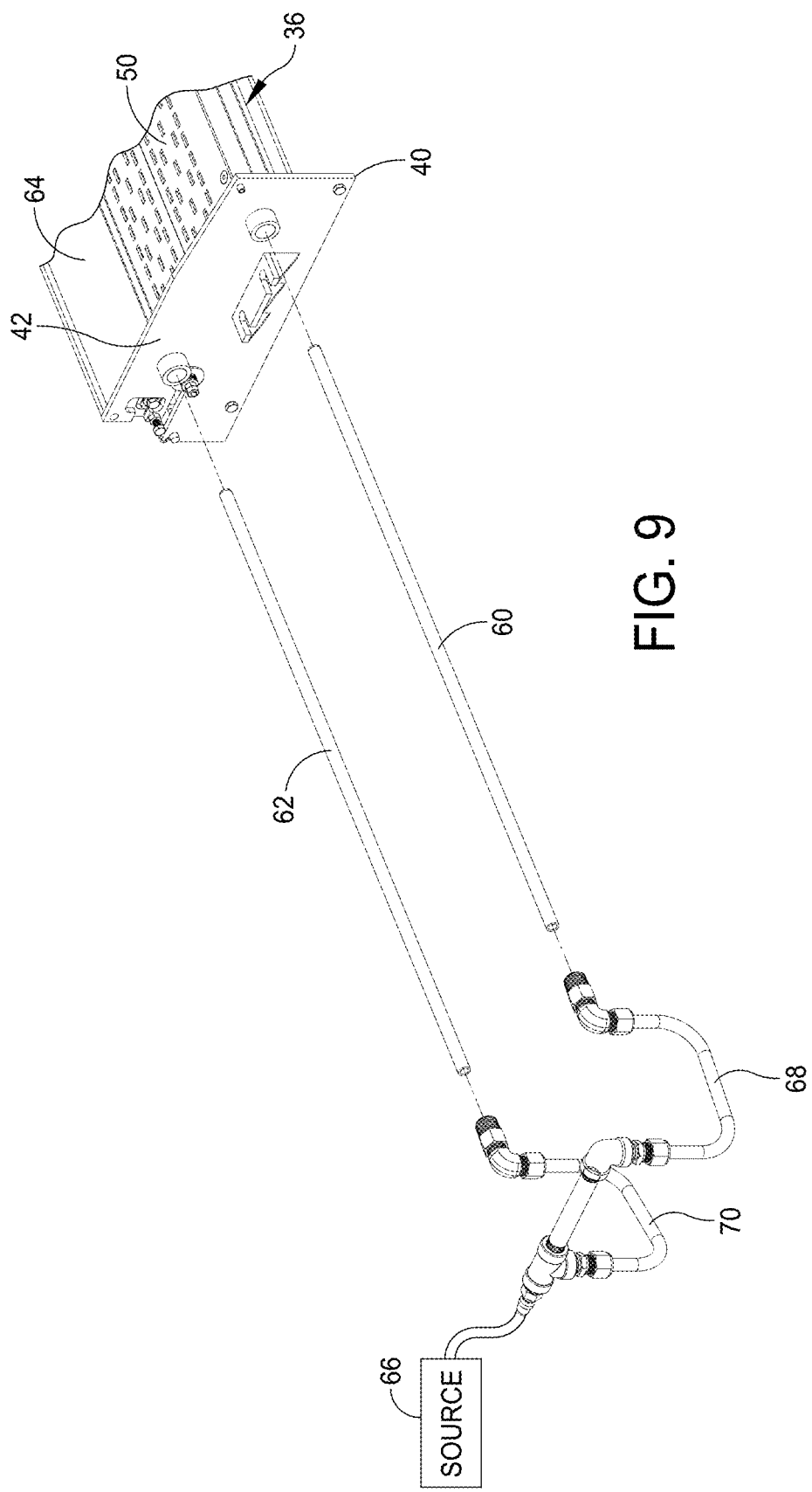

OPTIMIZATION OF NITROGEN DIFFUSERS FOR DROSS REDUCTION IN A WAVESOLDER MACHINE

BACKGROUND OF DISCLOSURE

1. Field of Disclosure

The present disclosure relates generally to apparatus and methods for manufacturing printed circuit boards and for assisting a process of soldering metals to integrated circuit boards, and more particularly to a wave soldering machine and related method having a wave solder nozzle assembly that includes nitrogen diffusers strategically positioned within a wave soldering station to create a more complete inert atmosphere during the wave soldering process.

2. Discussion of Related Art

In the fabrication of printed circuit boards, electronic components can be mounted to a printed circuit board by a process known as "wave soldering." In a typical wave solder machine, a printed circuit board (sometimes referred to as a "PCB") is moved by a conveyor on an inclined path past a fluxing station, a pre-heating station, and finally a wave soldering station. At the wave soldering station, a wave of solder is caused to well upwardly (by means of a pump) through a wave solder nozzle and contact portions of the printed circuit board to be soldered.

Printed wiring boards, circuit boards and other elements are preferably soldered in a gas atmosphere which at least partly reduces the oxygen content. The benefits of soldering in an atmosphere which has a reduced oxygen content are known. The use of nitrogen diffusers is known. FIG. 1 illustrates a wave soldering station 2 configured to generate a solder wave. The wave soldering station 2 includes three nitrogen diffusers 4, 6, 8 positioned in known locations within the wave soldering station 2. With such known systems, the nitrogen diffusers 4, 6, 8 are positioned above a solder wave generated by the wave soldering station 2. Thus, an inert atmosphere is created only in the space above the solder wave.

SUMMARY OF DISCLOSURE

One aspect of the present disclosure is directed to a wave soldering machine to perform a wave soldering operation on an electronic substrate. In one embodiment, the wave soldering machine comprises a wave soldering station including a solder pot having a reservoir of solder material, a flow duct positioned in the reservoir of the solder pot, and a wave soldering nozzle assembly coupled to the flow duct. The nozzle assembly is configured to generate a solder wave. The wave soldering machine further comprises a conveyor configured to deliver an electronic substrate to the wave soldering station, at least one first gas diffuser configured to supply gas to pass over the solder wave on each side of the solder wave and to provide a gas blanket over the solder wave, and at least one second gas diffuser configured to supply gas below the solder wave on each side of the solder wave and to provide a gas blanket under the solder wave.

Embodiments of the wave soldering machine further may include configuring the at least one first gas diffuser to include two gas diffusers positioned over the solder wave. One gas diffuser of the at least one first gas diffuser may be provided on a load side of the solder wave and the other gas diffuser of the at least one first gas diffuser may be provided on the unload side of the solder wave. The at least one second gas diffuser may include two gas diffusers positioned under the nozzle assembly and under the solder wave. One gas diffuser of the at least one second gas diffuser may be provided on the load side of the solder wave under the nozzle assembly and the other gas diffuser of the at least one second gas diffuser may be provided on the unload side of the solder wave under the nozzle assembly. The at least one second gas diffuser may include two gas diffusers positioned under the nozzle assembly and under the solder wave. One gas diffuser of the at least one second gas diffuser may be provided on the load side of the solder wave under the nozzle assembly and the other gas diffuser of the at least one second gas diffuser may be provided on the unload side of the solder wave under the nozzle assembly. Each of the at least one first gas diffuser and the at least one second gas diffuser is coupled to a gas supply source configured to deliver an inert gas to gas diffusers of the at least one first gas diffuser and the at least one second gas diffuser. The nozzle assembly further may include a core frame supported by the flow duct and configured to support a solder distribution baffle.

Another aspect of the present disclosure is directed to a method of providing an inert blanket for a solder wave. In one embodiment, the method comprises: generating the solder wave within a wave soldering station of a wave soldering machine; delivering an electronic substrate over the solder wave; supplying an inert gas through at least one first gas diffuser over the solder wave on each side of the solder wave and to provide a gas blanket over the solder wave; and supplying an inert gas through at least one second gas diffuser configured to supply gas below the solder wave on each side of the solder wave and to provide a gas blanket under the solder wave.

Embodiments of the method further may include delivering the electronic substrate over the solder wave by moving the electronic substrate on a conveyor. The method further may include positioning two gas diffusers of the at least one first gas diffuser over the solder wave. One gas diffuser of the at least one first gas diffuser may be provided on a load side of the solder wave and the other gas diffuser of the at least one first gas diffuser may be provided on the unload side of the solder wave. The method further may include positioning two gas diffusers of the at least one second gas diffuser under the nozzle assembly and under the solder wave. One gas diffuser of the at least one second gas diffuser may be provided on the load side of the solder wave under the nozzle assembly and the other gas diffuser of the at least one second gas diffuser may be provided on the unload side of the solder wave under the nozzle assembly. The method further may include positioning two gas diffusers of the at least one second gas diffuser under the nozzle assembly and under the solder wave. One gas diffuser of the at least one second gas diffuser may be provided on the load side of the solder wave under the nozzle assembly and the other gas diffuser of the at least one second gas diffuser may be provided on the unload side of the solder wave under the nozzle assembly. Supplying the inert gas through the at least one first gas diffuser and supplying the inert gas through the at least one second gas diffuser may include coupling each of the at least one first gas diffuser and the at least one second gas diffuser to a gas supply source configured to deliver an inert gas to gas diffusers of the at least one first gas diffuser and the at least one second gas diffuser.

Yet another aspect of the present disclosure is directed to a wave soldering station of a wave soldering machine configured to perform a wave soldering operation on an electronic substrate. In one embodiment, the wave soldering station comprises a solder pot having a reservoir of solder material, a flow duct positioned in the reservoir of the solder pot, a wave soldering nozzle assembly coupled to the flow duct, the nozzle assembly being configured to generate a solder wave, at least one first gas diffuser configured to supply gas to pass over the solder wave on each side of the solder wave and to provide a gas blanket over the solder wave, and at least one second gas diffuser configured to supply gas below the solder wave on each side of the solder wave and to provide a gas blanket under the solder wave.

Embodiments of the wave soldering station further may include configuring the at least one first gas diffuser with two gas diffusers positioned over the solder wave, one gas diffuser of the at least one first gas diffuser being provided on a load side of the solder wave and the other gas diffuser of the at least one first gas diffuser being provided on the unload side of the solder wave. The at least one second gas diffuser may include two gas diffusers positioned under the nozzle assembly and under the solder wave, one gas diffuser of the at least one second gas diffuser being provided on the load side of the solder wave under the nozzle assembly and the other gas diffuser of the at least one second gas diffuser being provided on the unload side of the solder wave under the nozzle assembly.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 9 is another exploded perspective view of the nitrogen diffusers prior to being installed in the wave soldering nozzle assembly.

DETAILED DESCRIPTION

Figure 1:
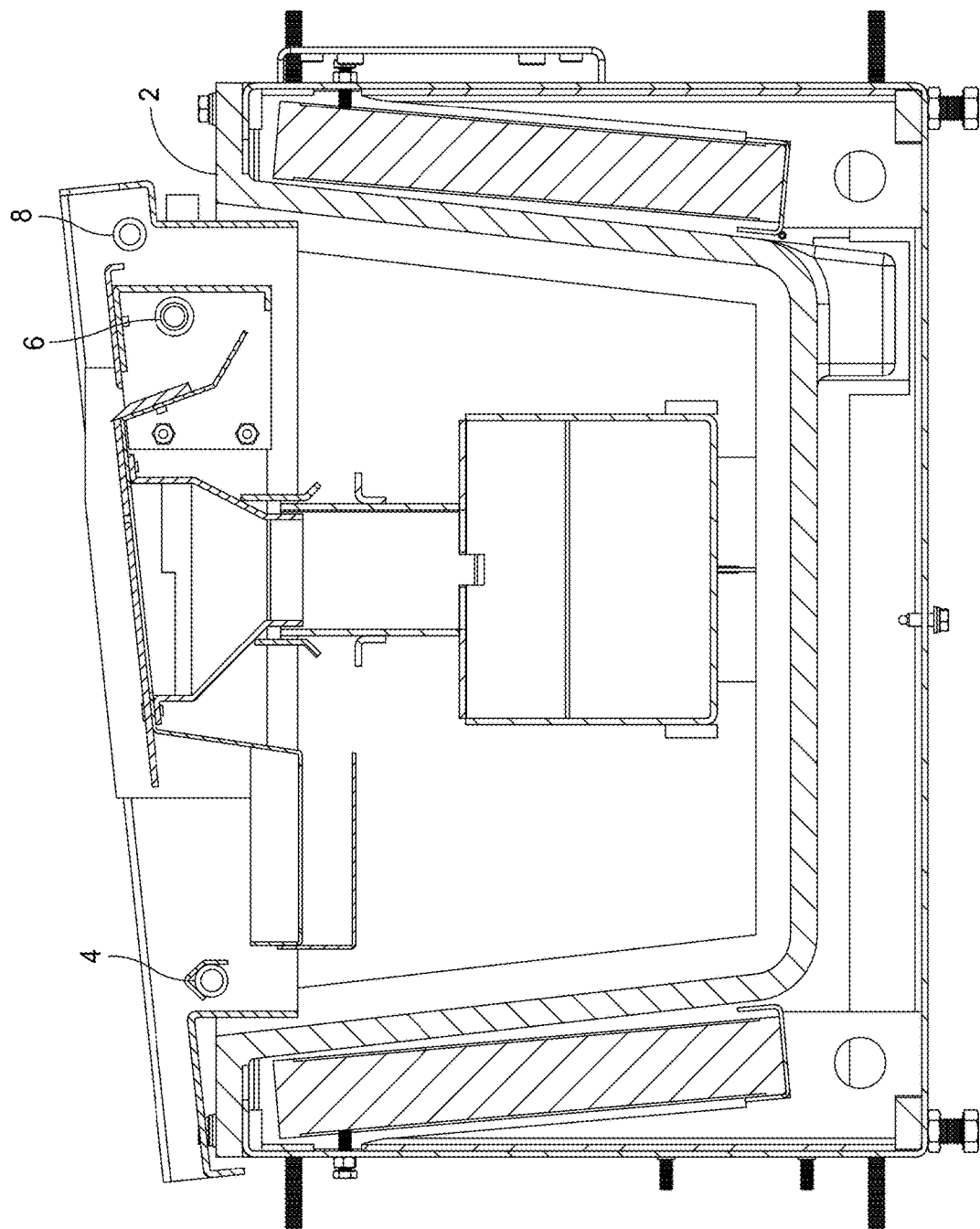
FIG. 1 is a cross-sectional view of a wave soldering station having nitrogen diffusers positioned in known locations within the wave soldering station.

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Embodiments of the present disclosure are directed to reducing the amount of dross generated during wave soldering processes. In a particular embodiment, nitrogen diffusers are positioned within a wave soldering station of a wave soldering machine above and below a solder wave generated by the wave soldering station.

Figure 2:
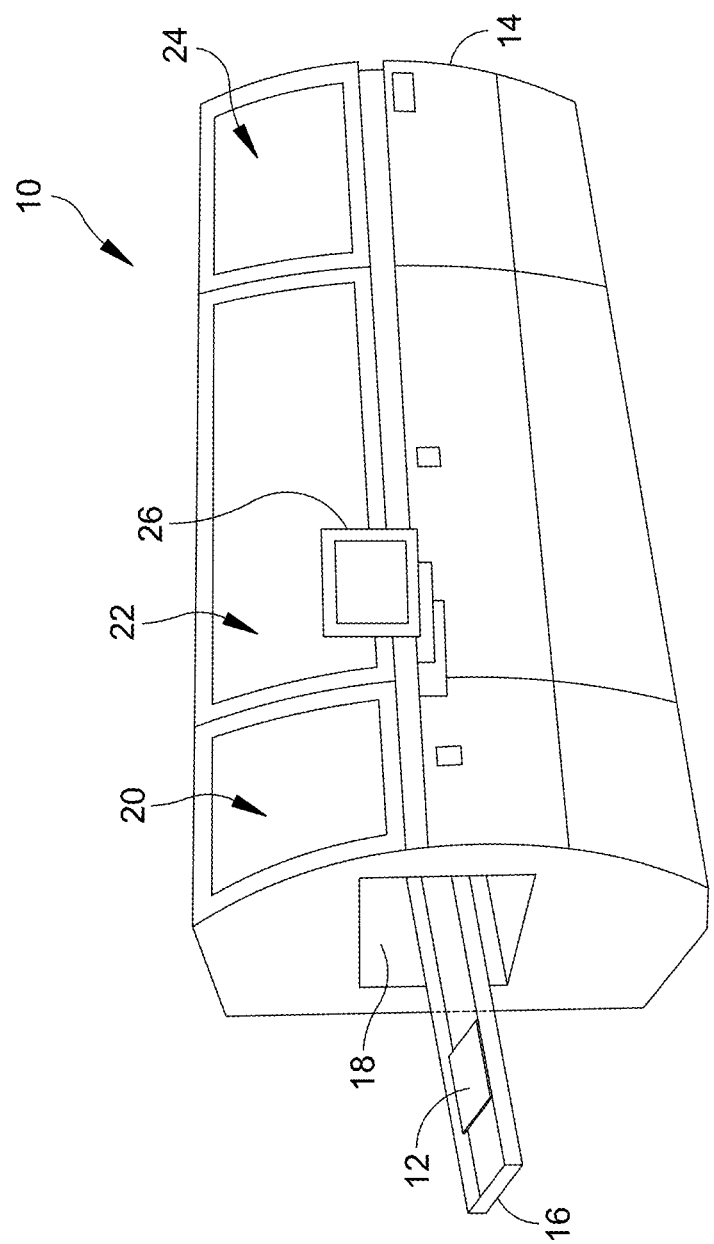
FIG. 2 is a perspective view of a wave soldering machine.

For purposes of illustration, and with reference to FIG. 2, embodiments of the present disclosure will now be described with reference to a wave soldering machine, generally indicated at 10, which is used to perform a solder application on a printed circuit board 12. In some embodiments, the printed circuit board 12 may be referred to as an electronic substrate. The wave soldering machine 10 is one of several machines in a printed circuit board fabrication/assembly line. As shown, the wave soldering machine 10 includes a housing or frame 14 adapted to house the components of the machine. The arrangement is such that a conveyor 16 delivers printed circuit boards to be processed by the wave soldering machine 10. Upon entering the wave soldering machine 10, each printed circuit board 12 travels along an inclined path (e.g., six degrees with respect to horizontal) along the conveyor 16 through a tunnel 18, which includes a fluxing station, generally indicated at 20, and a pre-heating station, generally indicated at 22, to condition the printed circuit board for wave soldering. Once conditioned (i.e., heated), the printed circuit board 12 travels to a wave soldering station, generally indicated at 24, to apply solder material to the printed circuit board. A controller 26 is provided to automate the operation of the several stations of the wave soldering machine 10, including but not limited to the fluxing station 20, the pre-heating station 22, and the wave soldering station 24, in the well-known manner.

Figure 3:
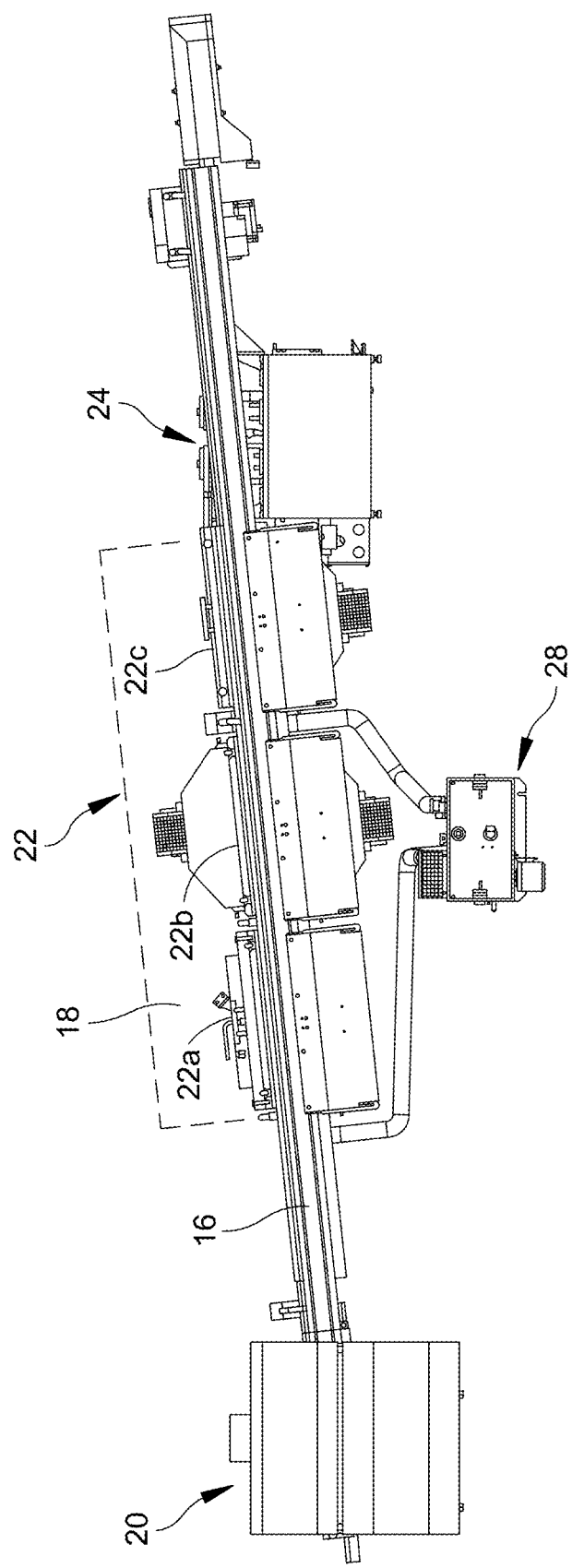
FIG. 3 is a side elevational view of the wave soldering machine with external packaging removed to reveal internal components of the wave soldering machine.

Referring to FIG. 3, the fluxing station 20 is configured to apply flux to the printed circuit board as it travels on the conveyor 16 through the wave soldering machine 10. The pre-heating station includes several pre-heaters (e.g., pre-heaters 22a, 22b and 22c), which are designed to incrementally increase the temperature of the printed circuit board as it travels along the conveyor 16 through the tunnel 18 to prepare the printed circuit board for the wave soldering process. As shown and described in greater detail below, the wave soldering station 24 includes a wave solder nozzle assembly in fluid communication with a reservoir of solder material. A pump is provided within the reservoir to deliver molten solder material to the wave soldering nozzle assembly from the reservoir. Once soldered, the printed circuit board exits the wave soldering machine 10 via the conveyor 16 to another station provided in the fabrication line, e.g., a pick-and-place machine.

In some embodiments, the wave soldering machine 10 further may include a flux management system, generally indicated at 28, to remove volatile contaminants from the tunnel 18 of the wave soldering machine. As shown in FIG. 3, the flux management system 28 is positioned below the pre-heating station 22. In one embodiment, the flux management system is supported by the housing 14 within the wave soldering machine, and is in fluid communication with the tunnel 18, which is schematically illustrated in FIG. 3. The flux management system 28 is configured to receive contaminated gas from the tunnel 18, treat the gas, and return clean gas back to the tunnel. The flux management system 28 is particularly configured to remove volatile contaminants from the gas, especially in inert atmospheres.

Figure 4:
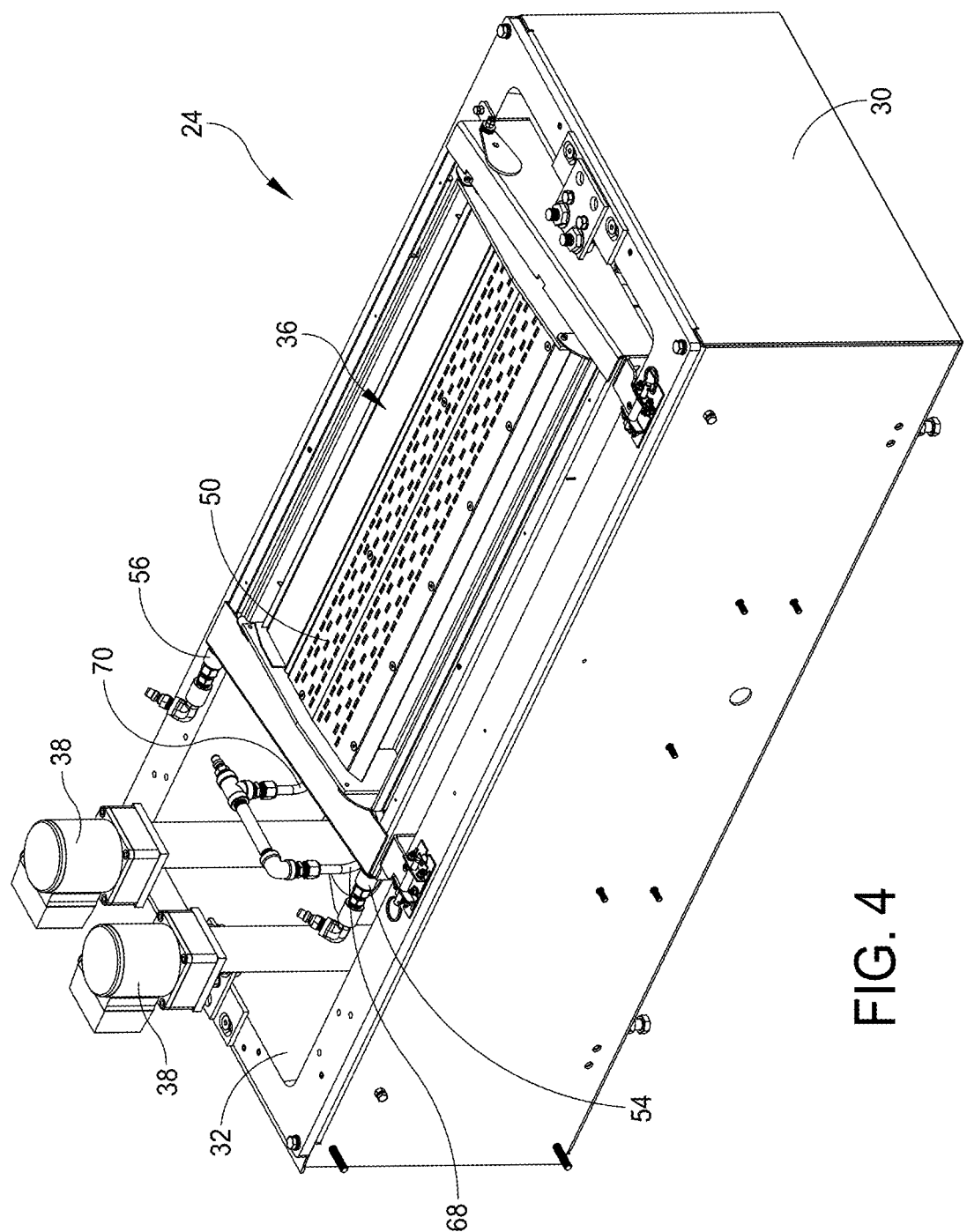
FIG. 4 is a perspective view of a wave soldering station having nitrogen diffusers positioned in locations of an embodiment of the present disclosure.
Figure 5:
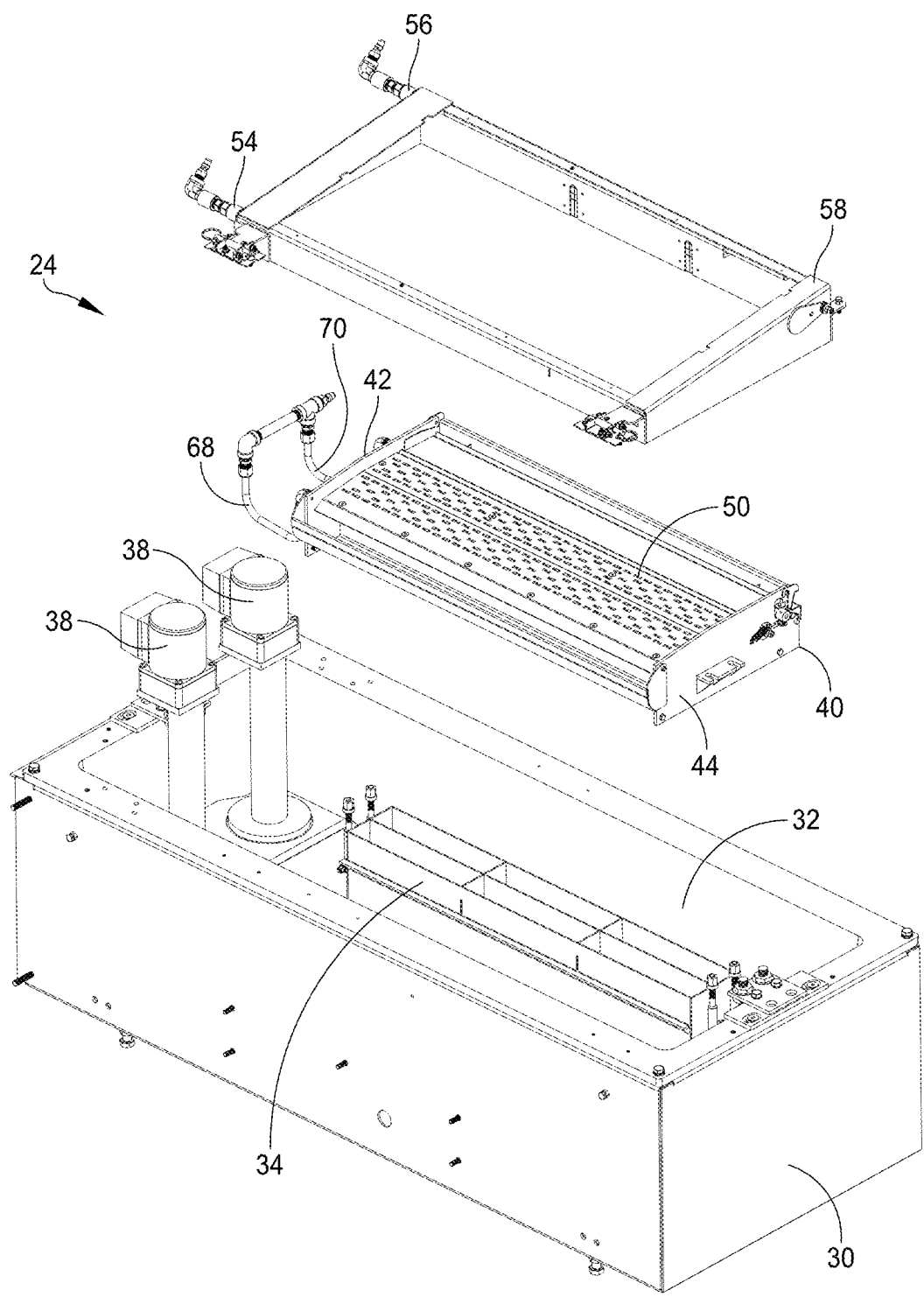
FIG. 5 is an exploded perspective view of the wave soldering station.

Referring to FIGS. 4 and 5, in one embodiment, the wave soldering station 24 includes a solder pot 30 that defines a reservoir 32 configured to contain molten solder. In one embodiment, the solder pot 30 is a box-shaped structure that supports the components of the wave soldering station 24 including a flow duct 34 configured to deliver pressurized molten solder to an opening or nozzle of a wave soldering nozzle assembly, which is generally indicated at 36. As will be described in greater detail below, the wave soldering nozzle assembly 36 is configured to channel the molten solder to the bottom of the printed circuit board 12 and to provide for smooth flow of solder back into the reservoir 32. Specifically, the wave soldering nozzle assembly 36 is capable of adjusting a height and a width of the solder wave when performing a wave soldering operation.

The wave soldering station 24 further includes two pump impellers, each indicated at 38, positioned within the reservoir 32 of the solder pot 30 adjacent an inlet provided in the flow duct 34. The pump impellers 38 pressurize the molten solder in the reservoir 32 to pump the molten solder vertically within the reservoir to the flow duct 34 to the wave soldering nozzle assembly 36. In one embodiment, each pump impeller 38 is a centrifugal pump that is suitably sized to pump the molten solder to the nozzle of the wave soldering nozzle assembly 36. The wave soldering nozzle assembly 36 is configured to generate a solder wave that is provided to attach components on the circuit board 12 in the manner described herein, and to optimize a dwell time during processing.

Figure 6:
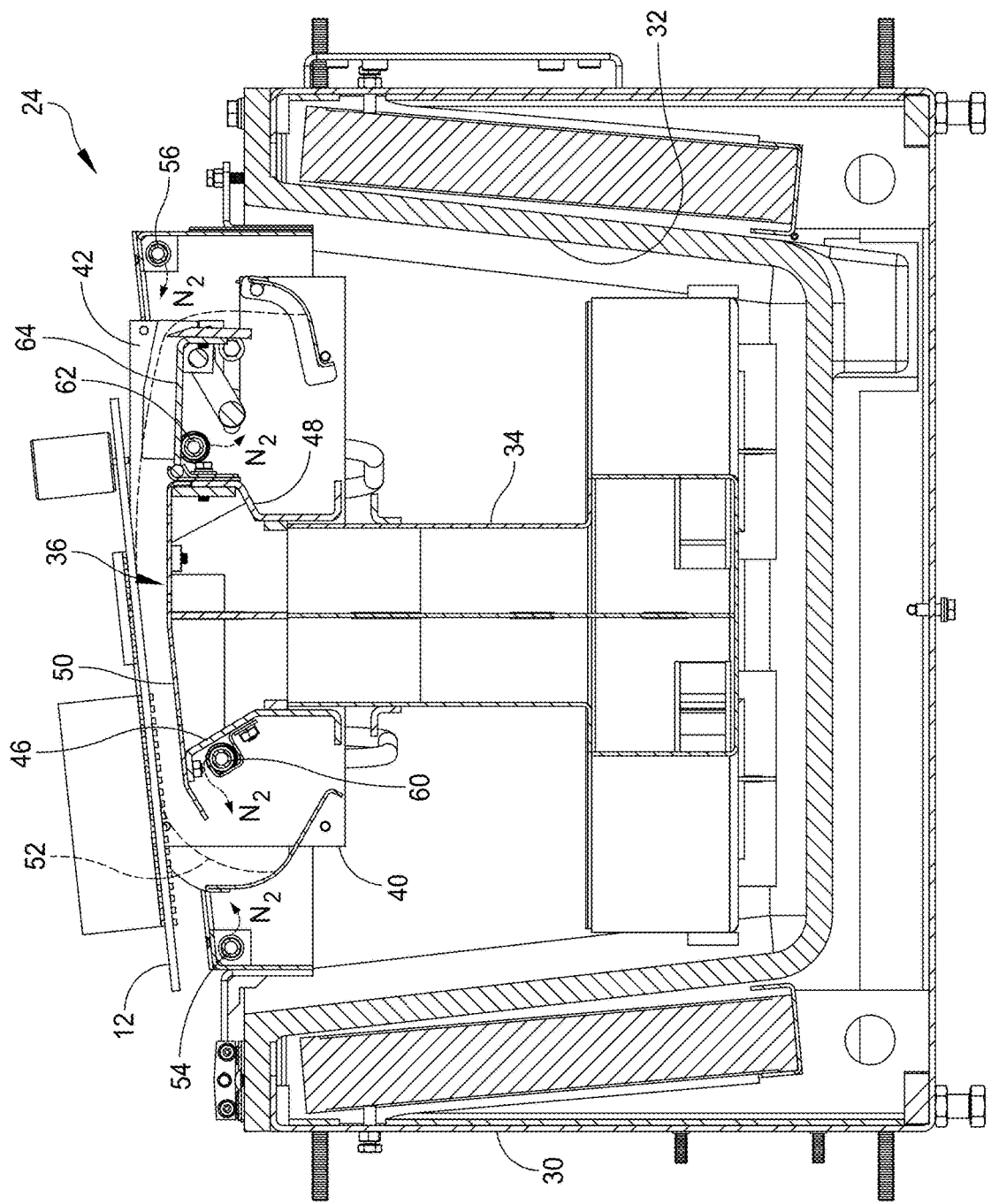
FIG. 6 is a cross-sectional view of a wave soldering station.

Referring to FIG. 6, the flow duct 34 includes two chambers, each chamber including an inlet, which are connected to a respective pump impeller 38. The flow of molten solder to the solder distribution baffle 50 is controlled by controlling the pump impellers 38. The flow of molten solder through the chambers can be independently controlled by controlling the pump impellers 38. The result is that the solder wave can be controlled by operating the pump impellers 38. For example, the solder wave can be controlled so that the wave extends through the solder distribution baffle 50 at a middle of the solder distribution baffle by shutting off pump one of the pump impellers 38. With this set up, dross is reduced since the width of the solder wave is significantly reduced.

Figure 7:
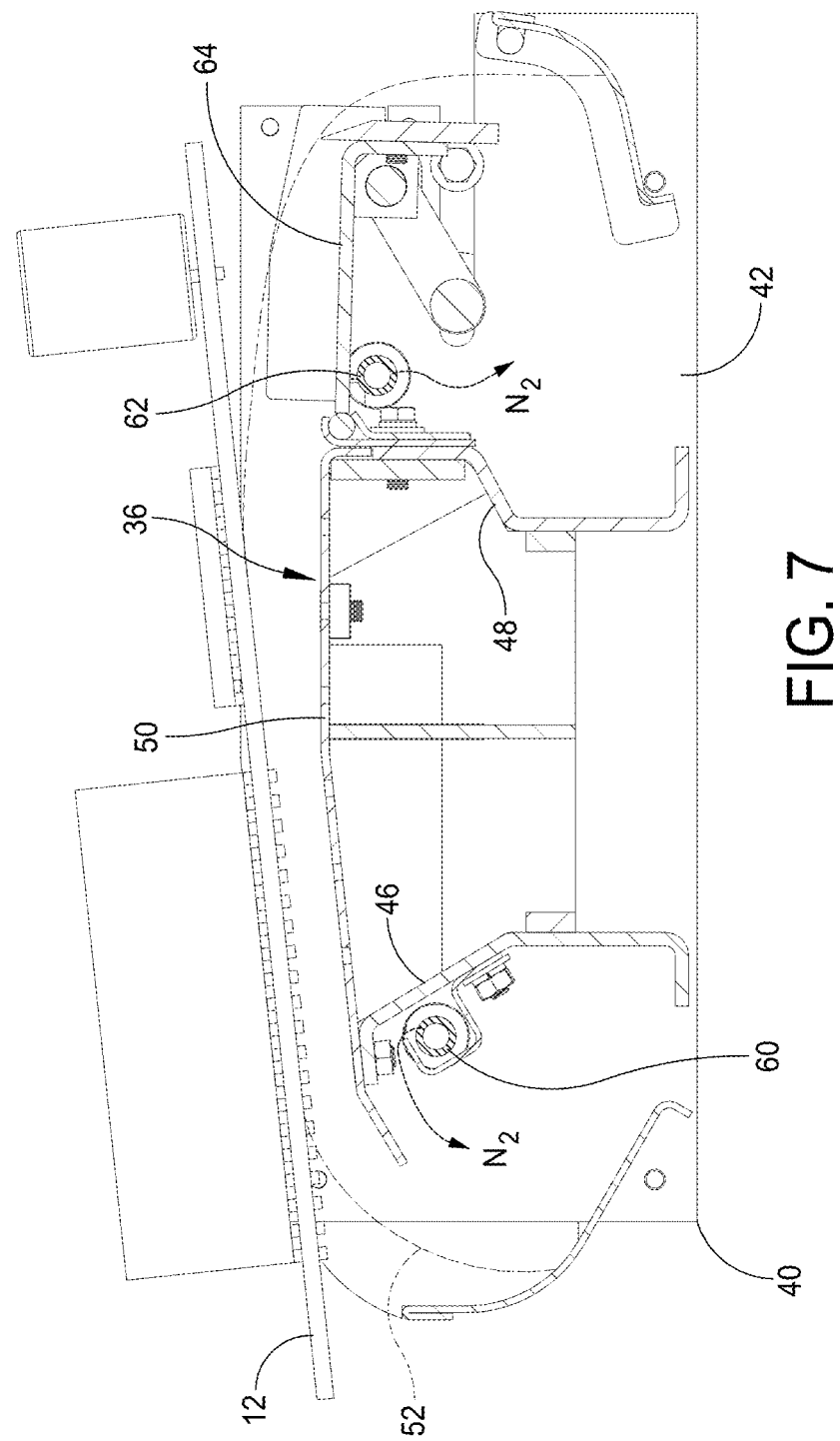
FIG. 7 is an enlarged cross-sectional view of the wave soldering station.

With additional reference to FIG. 7, the wave soldering nozzle assembly 36 includes a nozzle core frame 40 having two end walls 42, 44, a first longitudinal support element 46 and a second longitudinal support element 48 that extends between the end walls 42, 44. The nozzle core frame 40 further may include several cross support elements that extend between the first longitudinal support element 46 and the second longitudinal support element 48. The nozzle core frame 40 also directs the solder flow through a nozzle throat defined between the first and second longitudinal support elements 46, 48. The wave soldering nozzle assembly 36 further includes an elongate solder distribution baffle 50 that is secured to the first longitudinal support element 46 of the nozzle core frame 40. The solder distribution baffle 50 is secured to the first longitudinal support element 46 with screws, e.g., through openings located at the load side of the solder distribution baffle 50. In one embodiment, one side, i.e., the load side, of the solder distribution baffle 50 is secured to or formed integrally with the first longitudinal support element 46, and the other side, i.e., the unload side, of the solder distribution baffle 50 is secured to or integrally formed with the second longitudinal support element 48. In one embodiment, the solder distribution baffle 50 includes a unique pattern of elongate openings to enable molten solder to flow through the solder distribution baffle 50.

In some embodiments, the wave soldering nozzle assembly 36 further may include a dross box that is secured to the nozzle core frame 40 and configured to reduce turbulence as the solder travels back to the reservoir 32 of the solder pot 30, thereby reducing solder balls that can form within the reservoir 32.

Aspects of the present disclosure is directed to a system of creating a nitrogen or inert blanket above and below a solder wave indicated by dashed lines 52 in FIGS. 6 and 7, which is generated by the wave soldering nozzle assembly 36. In one embodiment, the system includes several gas diffusers, sometimes referred to as nitrogen tubes or diffusers, provided within the reservoir 32 of the solder pot 30 of the wave soldering station 24 to provide an inert atmosphere for the wave soldering process. As shown in FIG. 6, the system includes two gas diffusers 54, 56 positioned under a cover plate 58 and above the solder wave 52 on both sides of the solder wave 52. The two gas diffusers 54, 56 provide an inert blanket above the solder wave 52. One gas diffuser 54 is provided on the load side of the solder wave 52, just under the cover plate 58. The other gas diffuser 54 is provided on the unload side of the solder wave 52, just under the cover plate 58.

The system further includes two additional gas diffusers 60, 62 are positioned under the nozzle of the nozzle assembly 36 and under the solder wave 52 on both sides of the solder wave 52 to provide an inert blanket below the solder wave 52. One gas diffuser 60 is provided on the load side of the solder wave 52, just under the first longitudinal support element 46. The other gas diffuser 62 is provided on the unload side of the solder wave 52, just under an exit wing 64 of the nozzle assembly 36. The provision of the gas diffusers 60, 62 below the solder wave 52 ensures that the inert atmosphere is present when the molten solder is returned to the reservoir 32 of the solder pot 30.

Figure 8:
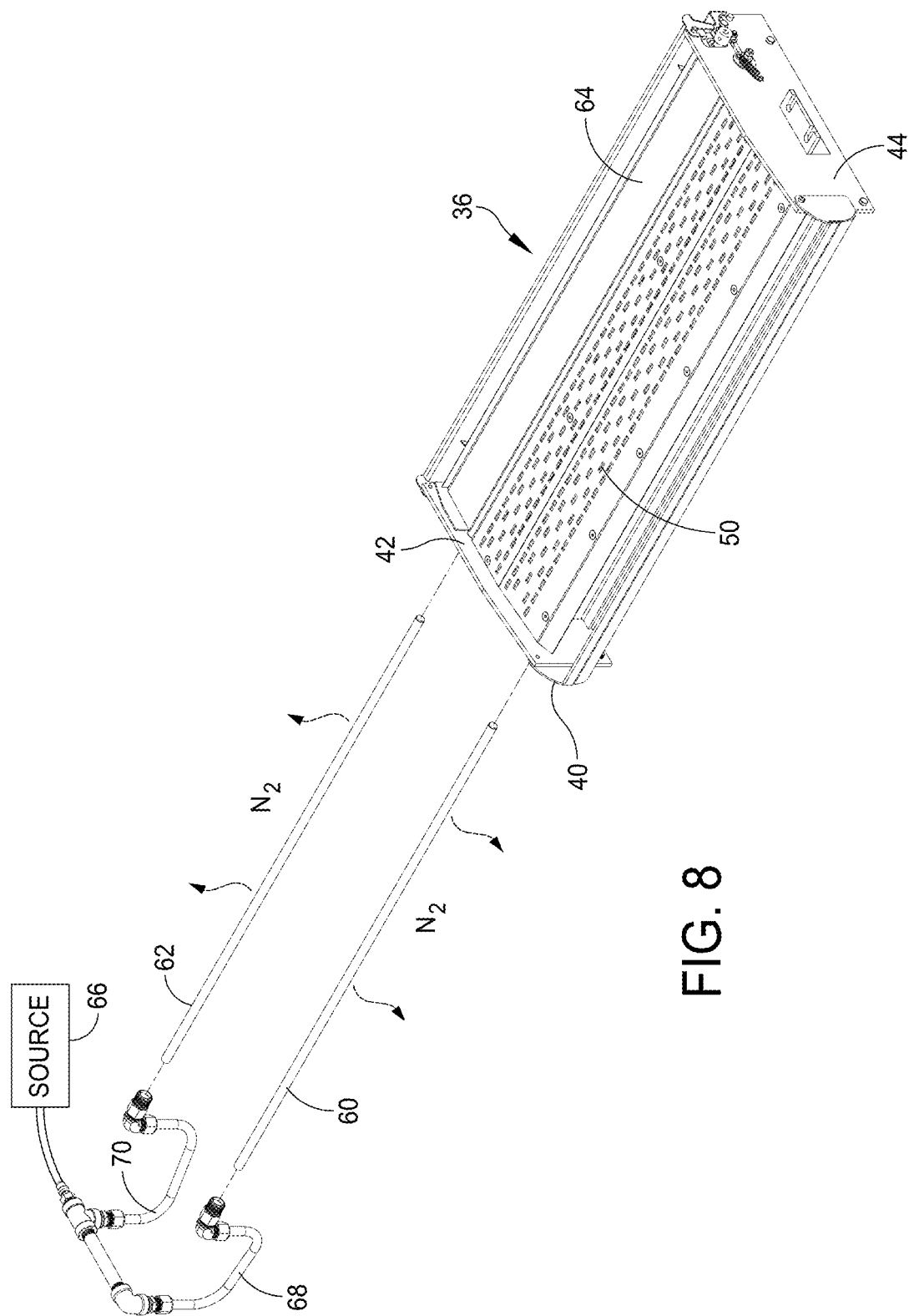
FIG. 8 is an exploded perspective view of nitrogen diffusers prior to being installed in a wave soldering nozzle assembly.

FIGS. 8 and 9 show the two gas diffusers 60, 62 prior to be inserted into the nozzle core frame 40 of the nozzle assembly 36. Each gas diffuser may be fabricated from a porous stainless steel tube. The porosity of the gas diffuser may be optimized to generate a laminar flow of gaseous nitrogen out of the gas diffuser. In one embodiment, the gas diffusers 60, 62 are suitably supported by the end wall 42 of the nozzle core frame 40 of the nozzle assembly 36. As shown, a gas supply source 66 is connected to the gas diffusers 60, 62 by lines 68, 70, respectively. In one embodiment, the gas supply source 66 can be an in situ supply source. Nitrogen, carbon dioxide and other inert gases may be supplied as a shield gas. An on-site non-cryogenic nitrogen supply may be provided. There are different devices known to produce nitrogen with less than 10% by volume oxygen present. The gas diffusers 54, 56 provided above the solder wave 52 may be similarly configured.

In one embodiment, with particular reference to FIG. 9, each gas diffuser 60, 62 is secured to the end wall 42 by a compression fitting that rigidly secures the gas diffuser by a compression sleeve and/or ferrule. The compression fitting is threadably secured to a threaded fitting welded to the end wall 42 of the nozzle core frame 40 to secure the gas diffuser 60, 62 to the end wall 42 of the nozzle frame core 40. The gas diffusers 54, 56 are secured to the cover plate 58 in a similar manner.

In one embodiment, the inert gas, e.g., nitrogen, passes through two flow control valves which in turn are connected to the gas diffusers 54, 56, respectively. Similarly, the inert gas passes through two additional flow control valves which in turn are connected to the gas diffusers 60, 62, respectively. The flow of the inert gas may be in the range of 200 to 600 cubic feet per hour from each set of gas diffusers. The gas supply to the diffusers can be varied by the flow control valves which in turn controls the flow of gas exiting from a slot in the cover plate 58 on each side of the solder wave 52. In one embodiment, the nitrogen supply may be turned off except when the printed circuit board 12 is passing through the wave soldering station 24. This may be achieved by manipulating the flow control valves or by turning off the gas supply.

In some embodiments, the positions of the gas diffusers 54, 56 above the solder wave 52 may be varied to optimize the coverage of the inert blanket over the solder wave 52. Similarly, the positions of the gas diffusers 60, 62 below the solder wave 52 may be varied to optimize the coverage of the inert blanket below the solder wave 52. Further, the number of gas diffusers provided above and below the solder wave 52 may be varied to optimize the coverage of the inert blankets above and below the solder wave 52.

In some embodiments, the gas supply source 66 includes compressed air supplied through a filter and into a membrane apparatus. The membrane apparatus includes a membrane, which splits the air flow into two portions, one being a nitrogen enriched portion. In one embodiment, this portion continues along a line to the gas diffusers 54, 56 and along another line to gas diffusers 60, 62. The other portion includes an oxygen enriched flow portion, which passes through another line back into the atmosphere. In one embodiment, the membrane apparatus produces nitrogen with an oxygen content of less than 10% by volume.

Embodiments of the present disclosure are directed to minimizing dross associated with the molten solder. The more complete blanket of inert gas ensures that the molten solder is not oxidized prior to returning to the reservoir 32 of the solder pot 30. Different combinations of tin, lead and other metals are used to create lead-based and lead-free solders. Dross is a mass of solid impurities floating on the surface of the molten solder or dispersed within the molten solder. For solder, dross has a tendency to form on the surface of the tin-based molten metal, with oxidized impurities creating the dross.

In another embodiment, a second stage membrane system may be provided. The oxygen content of the nitrogen is reduced to less than 5% by volume and in another embodiment to less than 1,000 ppm. The system for providing a nitrogen enriched air flow using the membrane technology is known. If there is a high demand of nitrogen, and this depends primarily upon soldering conditions, then the concentration of oxygen is higher. However, if the demand is less, then the concentration of oxygen is less.

While nitrogen gas has been referred to as a preferred embodiment for a shield gas, other inert gases may be provided, carbon dioxide being one example. In all cases it is preferred to keep the oxygen content less than about 10% by volume.

In operation, circuit boards 12 are conveyed by the conveyor 12 to the wave soldering station 24. The circuit boards 12 may have been pre-treated with a flux at the fluxing station 20 and heated at the pre-heating station 22. As the circuit boards 12 travel through the wave soldering station 24, an inert gas curtain is generated by gas diffusers 54, 56 and gas diffusers 60, 62. Specifically, an inert gas is suppled through the gas diffusers 54, 56 over the solder wave 52 on each side of the solder wave 52 under the cover plate 58 to provide a gas blanket over the solder wave 52. Further, an inert gas is supplied through the gas diffusers 60, 62 below the solder wave 52 on each side of the solder wave 52 to provide a gas blanket under the solder wave 52. For each circuit board 12, the underside of the circuit board 12 travels through the solder wave 52 and is coated with solder in the customary manner. The circuit boards 12 exit the wave soldering station for further processing within the printed circuit board fabrication line. The formation of dross in the reservoir 32 of the solder pot 30 is minimized by the effective measures taken to keep air away from the solder within the reservoir 32.

Various controllers may execute various operations discussed above. For example, as discussed above, the controller, such as controller 26, may control the components of the wave soldering machine 10 including the wave soldering station 24, amongst other operations. Using data stored in associated memory and/or storage, the controller may execute one or more instructions stored on one or more non-transitory computer-readable media, which the controller may include and/or be coupled to, that may result in manipulated data. In some examples, the controller may include one or more processors or other types of controllers. In one example, the controller is or includes at least one processor. In another example, the controller performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

With each embodiment, solder flow through the nozzle can be controlled to reduce and even prevent dross recirculation through the nozzle. By reducing the width of the solder wave, dross is reduced. Each embodiment enables the width of the solder wave to be reduced.

In some embodiments, as noted above, the wave soldering nozzle assembly further includes a dross box that is secured to the nozzle frame and configured to reduce turbulence as the solder travels back to the reservoir, thereby further reducing solder balls that can form within the reservoir.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A wave soldering machine to perform a wave soldering operation on an electronic substrate, the wave soldering machine comprising:
 a wave soldering station including a solder pot having a reservoir of solder material, a flow duct positioned in the reservoir of the solder pot, and a wave soldering nozzle assembly coupled to the flow duct, the nozzle assembly being configured to generate a solder wave having a load side and an unload side;

a conveyor configured to deliver an electronic substrate to the wave soldering station, the conveyor further being configured to move the electronic substrate over the solder wave from the load side to the unload side;

a first gas diffuser configured to supply gas to pass over the solder wave on the load side of the solder wave and a second gas diffuser configured to supply gas to pass over the solder wave on the unload side of the solder wave, the first gas diffuser and the second gas diffuser providing a gas blanket over the solder wave; and a third gas diffuser configured to supply gas below the solder wave on the load side of the solder wave and a fourth gas diffuser configured to supply gas below the solder wave on the unload side of the solder wave, the third gas diffuser and the fourth gas diffuser providing a gas blanket under the solder wave.

2. The wave soldering machine of claim 1, wherein the third gas diffuser is provided on the load side of the solder wave under the nozzle assembly and the fourth gas diffuser is provided on the unload side of the solder wave under the nozzle assembly.

3. The wave soldering machine of claim 1, wherein each of the first gas diffuser, the second gas diffuser, the third gas diffuser, and the fourth gas diffuser is coupled to a gas supply source configured to deliver an inert gas to the gas diffuser.

4. The wave soldering machine of claim 1, wherein the nozzle assembly further includes a core frame supported by the flow duct, the core frame being configured to support a solder distribution baffle.

5. A method of providing an inert blanket for a solder wave with the wave soldering machine of claim 1, the method comprising:

generating the solder wave within the wave soldering station of the wave soldering machine;

delivering the electronic substrate over the solder wave;

supplying an inert gas through the first gas diffuser over the solder wave on the load side of the solder wave and the second gas diffuser over the solder wave on the unload side of the solder wave to provide a gas blanket over the solder wave; and supplying an inert gas through the third gas diffuser below the solder wave on the load side of the solder wave and the fourth gas diffuser under the solder wave on the unload side of the solder wave to provide a gas blanket under the solder wave.

6. The method of claim 5, wherein delivering the electronic substrate over the solder wave includes moving the electronic substrate on the conveyor.

7. The method of claim 5, wherein the third gas diffuser is provided on the load side of the solder wave under the nozzle assembly and the fourth gas diffuser is provided on the unload side of the solder wave under the nozzle assembly.

8. The method of claim 5, wherein supplying the inert gas through the first gas diffuser, the second gas diffuser, the third gas diffuser, and the fourth gas diffuser includes coupling each of the first gas diffuser, the second gas diffuser, the third gas diffuser, and the fourth gas diffuser to a gas supply source configured to deliver an inert gas to gas diffusers.

9. A wave soldering station of a wave soldering machine configured to perform a wave soldering operation on an electronic substrate, the wave soldering station comprising:

a solder pot having a reservoir of solder material;

a flow duct positioned in the reservoir of the solder pot;

a wave soldering nozzle assembly coupled to the flow duct, the nozzle assembly being configured to generate a solder wave having a load side and an unload side;

a first gas diffuser configured to supply gas to pass over the solder wave on the load side of the solder wave and a second gas diffuser configured to supply gas to pass over the solder wave on the unload side of the solder wave, the first gas diffuser and the second gas diffuser providing a gas blanket over the solder wave; and a third gas diffuser configured to supply gas below the solder wave on the load side of the solder wave and a fourth gas diffuser configured to supply gas under the solder wave on the unload side of the solder wave, the third gas diffuser and the fourth gas diffuser providing a gas blanket under the solder wave.

10. The wave soldering station of claim 9, wherein the third gas diffuser is provided on the load side of the solder wave under the nozzle assembly and the fourth gas diffuser is provided on the unload side of the solder wave under the nozzle assembly.

11. The wave soldering machine of claim 2, wherein the fourth gas diffuser is provided on the unload side of the solder wave under an exit wing the nozzle assembly.

12. The wave soldering machine of claim 4, wherein each of the first gas diffuser, the second gas diffuser, the third gas diffuser, and the fourth gas diffuser extends from a first end of the core frame to a second end of the core frame.

13. The wave soldering machine of claim 4, wherein the third gas diffuser is secured to a first support element of the core frame, and the fourth gas diffuser is secured to a second support element of the core frame.

14. The wave soldering station of claim 9, wherein the fourth gas diffuser is provided on the unload side of the solder wave under an exit wing the nozzle assembly.

15. The wave soldering station of claim 9, wherein the nozzle assembly further includes a core frame supported by the flow duct, the core frame being configured to support a solder distribution baffle.

16. The wave soldering station of claim 15, wherein each of the first gas diffuser, the second gas diffuser, the third gas diffuser, and the fourth gas diffuser extends from a first end of the core frame to a second end of the core frame.

17. The wave soldering station of claim 15, wherein the third gas diffuser is secured to a first support element of the core frame, and the fourth gas diffuser is secured to a second support element of the core frame.

* * * * *